United States Patent
Ishikawa et al.

[11] Patent Number: 5,705,268
[45] Date of Patent: Jan. 6, 1998

[54] MAGNETIC RECORDING MEDIUM WITH MAGNETIC POWDER IN LOWER MAGNETIC LAYER HAVING PROTECTIVE IMAGE DIAMETERS

[75] Inventors: Akira Ishikawa; Hidehiko Nakayama; Kazutaka Yamashita, all of Tochigi-ken, Japan

[73] Assignee: Kao Corporation, Tokyo, Japan

[21] Appl. No.: 579,405

[22] Filed: Dec. 27, 1995

[30] Foreign Application Priority Data

Dec. 27, 1994 [JP] Japan ................... 6-326366

[51] Int. Cl.$^6$ ................... G11B 5/66; G11B 5/70
[52] U.S. Cl. ........... 428/336; 428/402; 428/694 B; 428/694 BH; 428/694 BB; 428/694 BM; 428/694 BA; 428/900
[58] Field of Search ............ 428/694 B, 694 BH, 428/694 BB, 900, 336, 402, 694 BA, 694 BM, 694 BU

[56] References Cited

U.S. PATENT DOCUMENTS 5,458,948 10/1995 Yanagita et al. ............... 428/141
5,510,168 4/1996 Mori et al. ............... 428/141

FOREIGN PATENT DOCUMENTS 57-162128 10/1982 Japan.
5-73883 3/1993 Japan.

OTHER PUBLICATIONS

"Kogaku Sosetsu No. 48, Chobiryushi-Kagakuto Oyo", by Gakkai Shuppan Center, 1985.
"Funtai Ryudo Sokutei Ho", by Yokendo K.K, 1970.

*Primary Examiner*—Paul J. Thibodeau
*Assistant Examiner*—Stephen Sand
*Attorney, Agent, or Firm*—Oblon, Spivak, McClelland, Maier & Neustadt, P.C.

[57] ABSTRACT

A magnetic recording medium comprising a nonmagnetic support having formed thereon a plurality of magnetic layers including a top magnetic layer and an intermediate magnetic layer adjacent to the top magnetic layer, wherein the intermediate magnetic layer contains soft magnetic powder, the soft magnetic powder having, in its projective image, an average longer diameter $<L>$ and a standard deviation of the longer diameter $\Delta L$ satisfying the relationship represented by formula (1), and an average shorter diameter $<W>$ and a standard deviation of the shorter diameter $\Delta W$ satisfying the relationship represented by formula (2):

$$0.05 \leq \Delta L/<L> \leq 0.8 \qquad (1)$$

$$0.05 \leq \Delta W/<W> \leq 0.8 \qquad (2)$$

19 Claims, 1 Drawing Sheet

MAGNETIC RECORDING MEDIUM WITH MAGNETIC POWDER IN LOWER MAGNETIC LAYER HAVING PROTECTIVE IMAGE DIAMETERS

BACKGROUND OF THE INVENTION

1. Field of the Invention

This invention relates to a magnetic recording medium excellent in output (C/N) characteristics and overwrite characteristics.

2. Description of Related Art

Magnetic recording media have been widely used in the form of tapes, discs, drums, sheets, etc. These magnetic recording media are generally prepared by coating a nonmagnetic support, such as a polyester film, with a magnetic coating composition consisting mainly of magnetic powder and a binder. In recent years, there has been a demand for magnetic recording media having a reduced size and an increased recording density. In order to meet this demand, it has been proposed, for example, (1) to improve the coercive force Hc or residual flux density Br of the magnetic layer and (2) to reduce the thickness of the magnetic layer. The proposal (2) specifically includes a so-called multi-layer coating method in which a second layer (intermediate layer) is provided between the magnetic layer (first layer) and the support, and the second layer and the magnetic layer are formed by multi-layer coating.

However, proposal (1) is accompanied by reduction in overwrite characteristics. Proposal (2) requires equalization of the flow characteristics of the coating composition forming the magnetic layer and that forming the second layer. However, such equalization has not yet been achieved sufficiently, so that the method involves interfacial disturbance between the magnetic layer and the second layer and impairment of the surface smoothness of the magnetic layer, resulting in deterioration of electromagnetic characteristics.

SUMMARY OF THE INVENTION

Accordingly, an object of the present invention is to provide a magnetic recording medium having satisfactory surface smoothness, excellent output (C/N) characteristics, and excellent overwrite characteristics.

The inventors of the present invention have conducted extensive investigations in order to solve the above-mentioned problems and have found, as a result, that the above object of the present invention is accomplished by a magnetic recording medium having a magnetic layer containing soft magnetic powder having a specific particle size distribution as an intermediate layer adjacent to a top magnetic layer.

The present invention has been completed based on this finding and provides a magnetic recording medium comprising a nonmagnetic support having formed thereon a plurality of magnetic layers including a top magnetic layer and an intermediate magnetic layer between the support and the top magnetic layer, wherein the intermediate magnetic layer contains soft magnetic powder, the soft magnetic powder having, in its projective image, an average longer diameter $<L>$ and a standard deviation of the longer diameter $\Delta L$ satisfying the relationship represented by formula (1), and an average shorter diameter $<W>$ and a standard deviation of the shorter diameter $\Delta W$ satisfying the relationship represented by formula (2):

$$0.05 \leq \Delta L/<L> \leq 0.8 \quad (1)$$

$$0.05 \leq \Delta W/<W> \leq 0.8 \quad (2)$$

The magnetic recording medium according to the present invention has satisfactory surface smoothness, excellent output (C/N) characteristics, and excellent overwrite characteristics.

DETAILED DESCRIPTION OF THE INVENTION

Figure 1:
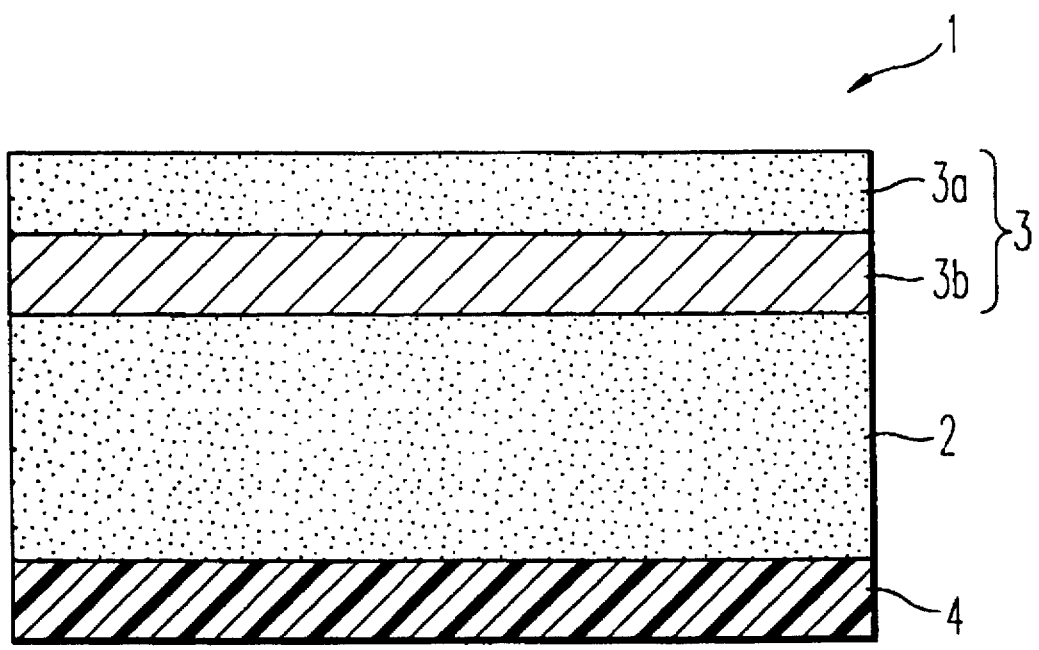
FIG. 1 is a schematic cross section illustrating the layer structure of the magnetic recording medium of the present invention.

The magnetic recording medium of the present invention will be described below in detail.

The explanation is made for preferred structures of the magnetic recording medium of the invention by referring to FIG. 1.

As shown in FIG. 1, a magnetic recording medium 1 according to the present invention is comprised of a nonmagnetic support 2 having provided thereon a plurality of magnetic layers 3, and the plurality of magnetic layers 3 are composed of a top magnetic layer 3a and an intermediate or lower magnetic layer 3b which is provided to adjoin the top magnetic layer 3a. If desired, a backcoat layer 4 is provided on the reverse side of the nonmagnetic support 2.

The magnetic recording medium of the present invention may further have other layers, such as a primer layer between the nonmagnetic support and the intermediate or lower magnetic layer or the backcoat layer and a third magnetic layer for recording servo signals to cope with hard systems using long wavelength signals, in addition to the above-mentioned nonmagnetic support, top and intermediate magnetic layers, and backcoat layer.

The nonmagnetic support 2 which can be used in the magnetic recording medium of the present invention can be selected from those commonly known with no particular restriction. Examples of useful nonmagnetic supports include flexible films or discs made of polymers; and films, discs or cards made of nonmagnetic metals, e.g., Cu, Al or Zn, glass, or ceramics, e.g., porcelain or earthenware.

The polymers providing flexible films or discs include polyesters, such as polyethylene terephthalate, polybutylene terephthalate, polyethylene naphthalate, polycyclohexylene dimethylene terephthalate, and polyethylene bisphenoxycarboxylate; polyolefins, such as polyethylene and polypropylene; cellulose derivatives, such as cellulose acetate butyrate and cellulose acetate propionate; vinyl resins, such as polyvinyl chloride and polyvinylidene chloride; polyamides, polyimides, polycarbonates, polysulfones, polyether ether ketones, polyurethanes, and the like. These polymers may be used either individually or as a combination of two or more thereof.

The backcoat layer which, if desired, may be provided on the reverse side of the nonmagnetic support can be formed by using any known backcoating composition with no particular limitation.

The top magnetic layer to be provided on the nonmagnetic support can be formed by coating an intermediate or lower magnetic layer hereinafter described with a first magnetic coating composition.

The first magnetic coating composition preferably includes those comprising magnetic powder, a binder, and a solvent.

The magnetic powder may be ferromagnetic metal powder consisting predominantly of iron or hexagonal ferrite powder.

The ferromagnetic metal powder preferably has a coercive force of 1600 to 2500 Oe, still preferably 1700 to 2400 Oe. The hexagonal ferrite powder preferably has a coercive force of 1300 to 2300 Oe. If the coercive force of the ferromagnetic metal powder or the hexagonal ferrite powder is less than the respective lower limit, the magnetic layer is subject to demagnetization, resulting in reduction in short wavelength RF output. If the coercive force exceeds the respective upper limit, the head magnetic field would be insufficient, which leads to insufficient writing ability and ultimately leads to reduction of overwrite characteristics. Accordingly, the above-described range of coercive force is preferred.

The saturation magnetization of the ferromagnetic metal powder preferably ranges from 100 to 180 emu/g, more preferably 110 to 160 emu/g, still preferably 130 to 160 emu/g, still more preferably 140 to 160 emu/g. That of the hexagonal ferrite powder preferably ranges from 30 to 70 emu/g, still preferably 45 to 70 emu/g. If the saturation magnetization of these powders is less than the respective lower limit, the magnetic flux density of the magnetic layer is low, and the output is reduced. If it exceeds the respective upper limit, the mutual magnetic interaction among individual magnetic particles is increased. It follows that the magnetic powder tends to agglomerate, making it difficult to obtain a desired output. Hence the above-specified range is preferred.

Accordingly, of top magnetic layer containing the above-mentioned ferromagnetic metal powder preferably has a coercive force of 1800 to 2400 Oe, still preferably 1800 to 2300 Oe, while the layer containing the above-mentioned hexagonal ferrite powder preferably has a coercive force of 1600 to 2200 Oe. The saturation flux density of the top magnetic layer containing the ferromagnetic metal powder is preferably 3000 to 4500 gauss, still preferably 3200 to 4000 gauss, while that of the layer containing the hexagonal ferrite powder is preferably 1500 to 2500 gauss, still preferably 1600 to 2500 gauss.

The ferromagnetic metal powder includes one having a metal content of not less than 50% by weight, 60% by weight or more of which consists of Fe. Specific examples of the ferromagnetic metal powders are Fe-Co, Fe-Ni, Fe-Al, Fe-Ni-Al, Fe-Co-Ni, Fe-Ni-Al-Zn, and Fe-Al-Si. The ferromagnetic metal powder has an acicular shape or a spindle shape, with its longitudinal axis preferably having a length of 0.05 to 0.25 μm, still preferably 0.05 to 0.2 μm, its acicular ratio being preferably 3 to 20, and its crystal size determined by an X-ray diffraction method being preferably 130 to 250 Å.

The hexagonal ferrite powder includes fine tabular particles of barium ferrite or strontium ferrite and these particles with the Fe atoms thereof partly displaced with Ti, Co, Ni, Zn, V or the like atoms. The hexagonal ferrite powder preferably has a tabular diameter of 0.02 to 0.09 μm and an aspect ratio of 2 to 7.

If desired, the magnetic powder may contain rare earth elements or transition metal elements.

In the present invention, the magnetic powder may be subjected to a surface treatment for improving dispersibility and the like.

The surface treatment can be carried out in the same manner as the method described in *Characterization of Powder Surfaces*, Academic Press, for example, by coating the surface of the magnetic powder with an inorganic oxide. The inorganic oxide to be used in this surface treatment includes $Al_2O_3$, $SiO_2$, $TiO_2$, $ZrO_2$, $SnO_2$, Zno, and the like. These inorganic oxides may be used either individually or as a mixture of two or more thereof.

The surface treatment may also be conducted organically by treatment with a silane coupling agent, a titanium coupling agent or an aluminum coupling agent.

The binder which can be used in the magnetic coating composition includes thermoplastic resins, thermosetting resins, and reactive resins, either individually or as a mixture thereof.

Examples of suitable binders are vinyl chloride resins, polyesters, polyurethanes, nitrocellulose, and epoxy resins. In addition, the resins described in Japanese Patent Laid-open No. 162128/82, page 2, upper right column, line 19 to page 2, lower right column, line 19 may also be used. These binders may contain a polar group for improvement in dispersibility.

The binder is used in an amount preferably of from about 5 to 100 parts by weight, still preferably of from 5 to 70 parts by weight, per 100 parts by weight of the magnetic powder.

The solvent which can be used in the magnetic coating composition includes ketones, esters, ethers, aromatic hydrocarbons, and chlorinated hydrocarbons. Specific examples of useful solvents are described in Japanese Patent Laid-open No. 162128/82, page 3, lower right column, line 17 to page 4, upper left column, line 10.

The solvent is preferably used in an amount of from 80 to 500 parts, still preferably 100 to 350 parts, by weight per 100 parts by weight of the magnetic powder.

If desired, the magnetic coating composition may contain additives generally used in magnetic recording media, such as dispersants, lubricants, abrasives, antistatics, rust inhibitors, antifungals, and curing agents. Specific examples of these additives are given in Japanese Patent Laid-open No. 162128/82, page, 2, upper left column, line 6 to page 2, upper right column, line 10 and page 3, upper left column, line 6 to page 3, upper right column, line 18.

The magnetic coating composition can be prepared by, for example, preliminarily mixing the magnetic powder, the binder, and a part of the solvent in a Naughter mixer, etc., kneading the premixture in a continuous pressure kneader, etc., diluting the mixture with another part of the solvent, followed by dispersing by means of a sand mill, etc., adding necessary additives such as a lubricant to the dispersion, filtering the mixture, and adding thereto a hardener, such as a polyisocyanate, and the remainder of the solvent.

The top magnetic layer preferably has a thickness of 0.05 to 1.0 μm, still preferably 0.05 to 0.8 μm. If the thickness is less than 0.05 μm, uniform coating is difficult, and the resulting layer tends to have reduced durability. If the thickness exceeds 1.0 μm, a thickness loss would be increased, tending to result in considerable reduction of overwrite characteristics. Therefore, the above-specified thickness range is recommended.

Where the top magnetic layer contains ferromagnetic metal powder and has a coercive force of 1800 to 2400 Oe and a saturation flux density of 3000 to 4500 gauss, or where the top magnetic layer contains hexagonal ferrite powder and has a coercive force of 1600 to 2200 Oe and a saturation flux density of 1500 to 2500 gauss, it is preferable that the top magnetic layer have a thickness of 0.05 to 1.0 μm and that the top magnetic layer is formed on the intermediate magnetic layer hereinafter described while the latter layer is wet.

The intermediate magnetic layer of the magnetic recording medium of the present invention, which is provided to be adjacent to the first magnetic layer, is a layer containing soft magnetic powder having a specific particle size distribution. The intermediate magnetic layer is formed by coating the nonmagnetic support with a second magnetic coating composition.

The second magnetic coating composition preferably includes those comprising soft magnetic powder, a binder, and a solvent.

While the soft magnetic powder to be used is not particularly limited in kind as long as it is soft magnetic powder, magnetic materials used in miniature electrical devices, such as a magnetic head and an electron circuit, are particularly preferred. For example, the soft magnetic materials described in S. Chimazumi, "Physics of Ferromagnetism, Vol II, Magnetic Characteristics and Engineering Application", pp. 368–376, Shokabo (1984) can be used. Soft magnetic oxide powders may be mentioned as specific examples.

Spinel type ferrite powders are preferably used as soft magnetic oxide powders. The spinel type ferrite powders include $MnFe_2O_4$, $Fe_3O_4$, $CoFe_2O_4$, $NiFe_2O_4$, $MgFe_2O_4$, $Li_{0.5}Fe_{2.5}O_4$, Mn-Zn type ferrite, Ni-Zn type ferrite, Ni-Cu type ferrite, Cu-Zn type ferrite, Mg-Zn type ferrite, and Li-Zn type ferrite. Preferred are Mn-Zn type ferrite and Ni-Zn type ferrite. These soft magnetic materials may be used either individually or as a combination of two or more thereof.

Soft magnetic metal powder can also be used as soft magnetic powder. Useful soft magnetic metal powders include Fe-Si alloys, Fe-Al alloys (e.g., Alperm, Alfenol and Alfer), Permalloy (e.g., Ni-Fe binary alloys or multinary alloys composed of the Ni-Fe binary alloy and Mo, Cu, Cr, etc.), Sendust (Fe-Si-Al alloy consisting of 9.6 wt % of Si, 5.4 wt % of Al, and the balance of Fe), and Fe-Co alloys. These powders may be used either individually or as a combination of two or more thereof.

The above-described soft magnetic oxide powder usually has a coercive force of 0.1 to 150 Oe and a saturation magnetization of 30 to 90 emu/g. The above-described soft magnetic metal powder usually has a coercive force of 0.02 to 100 Oe and a saturation magnetization of 50 to 500 emu/g.

In the magnetic recording medium according to the present invention, the soft magnetic powder contained in the intermediate magnetic layer has, in its projective image, an average of the longer diameter <L> and a standard deviation of the longer diameter ΔL satisfying the relationship represented by formula (1), preferably the relationship represented by formula (1'), and an average of the shorter diameter <W> and a standard deviation of the shorter diameter ΔW satisfying the relationship represented by formula (2), preferably the relationship represented by formula (2'):

$$0.05 \leq \Delta L/<L> \leq 0.8 \quad (1)$$

$$0.1 \leq \Delta L/<L> \leq 0.7 \quad (1')$$

$$0.05 \leq \Delta W/<W> \leq 0.8 \quad (2)$$

$$0.1 \leq \Delta W/<W> \leq 0.7 \quad (2')$$

Powder having ΔL/<L> and ΔW/<W> of less than 0.05 is difficult to prepare in practice. If ΔL/<L> and ΔW/<W> exceed 0.8, the powder has a broad particle size distribution and contains coarse particles, only to provide reduced smoothness of the interface between the top magnetic layer and the intermediate magnetic layer.

The average <L> of the longer diameter L is preferably 0.01 to 0.2 μm, and the standard deviation ΔL of the longer diameter L is preferably 0.003 to 0.2 μm.

The average <W> of the shorter diameter W is preferably 0.01 to 0.2 μm, and the standard deviation ΔW of the shorter diameter W is preferably 0.003 to 0.2 μm.

The average <L> and the standard deviation ΔL of the longer diameter L, and the average <W> and the standard deviation ΔW of the shorter diameter W can be obtained as follows.

Soft magnetic powder is observed under a transmission electron microscope (TEM), and a micrograph of the particles is taken at 30000 magnification. The micrograph is subjected to image processing by means of a digitizer to measure longer and shorter diameters of 500 particles, and the average thereof <L> and <W> and the standard deviations ΔL and ΔW are obtained (see, e.g. "KAGAKU SOSETSU No. 48, Chobiryushi—Kagaku to Oyo", pp. 65–86, edited by Nihon Kagaku-kai, issued by Gakkai Shuppan Center in 1985, or "Funtai Ryudo Sokutei Ho", pp. 40–54 edited by Funtai Kogaku Kenkyukai, issued by Yokendo K. K. in 1970).

The soft magnetic powder satisfying the relationships (1) and (2) can be prepared, for example, as follows.

The soft magnetic metal powder can be obtained by a gas phase method, and the soft magnetic oxide powder can be obtained by a glass crystallization method, a coprecipitation firing method, a calcination method, a hydrothermal synthesis method, a sol-gel method, and the like.

While the shape of the soft magnetic powder is not particularly limited as long as the formulae (1) and (2) are satisfied, spherical, tabular or amorphous powder is preferred.

A particle of the soft magnetic powder may be regarded as a flat plate, and in a flat projective image of the particle, two points where a straight line passing the center of gravity of the image intersects the circumference of the image are determined. The terminology "longer diameter" denotes the longest length between the two points, and the terminology "shorter diameter" denotes the shortest length between the two points.

The binder and the solvent which can be used in the second magnetic coating composition can be selected from those usable in the first magnetic coating composition.

The binder is preferably used in an amount of 5 to 200 parts by weight, still preferably 5 to 100 parts by weight, per 100 parts by weight of the soft magnetic powder or the total amount of the soft magnetic powder and nonmagnetic powder which may be added if desired as hereinafter described. The solvent is preferably used in an amount of 80 to 500 parts by weight, still preferably 100 to 350 parts by weight, per 100 parts by weight of the soft magnetic powder.

If desired, the second magnetic coating composition may contain additives generally used in magnetic recording media, such as dispersants, lubricants, abrasives, antistatics, rust inhibitors, antifungals, and curing agents. Specific examples of these additives are given in Japanese Patent Laid-Open No. 162128/82, page, 2, upper left column, line 6 to page 2, upper right column, line 10 and page 3, upper left column, line 6 to page 3, upper right column, line 18.

The second magnetic coating composition may contain nonmagnetic powder.

The nonmagnetic powder which can be used in the second coating composition is not particularly limited as long as it is nonmagnetic. Suitable nonmagnetic powders include particles of carbon black, graphite, titanium oxide, barium sulfate, zinc sulfide, magnesium carbonate, calcium carbonate, zinc oxide, calcium oxide, magnesium oxide, tungsten disulfide, molybdenum disulfide, boron nitride, tin dioxide, silicon dioxide, nonmagnetic chromium oxide, aluminum oxide, silicon carbide, cerium oxide, corundum, artificial diamond, nonmagnetic iron oxide, garnet, siliceous stone, silicon nitride, molybdenum carbide, boron carbide, tungsten carbide, titanium carbide, diatomaceous earth, dolomite, and resins. Carbon black, titanium oxide, barium sulfate, calcium carbonate, aluminum oxide, and nonmagnetic iron oxide are particularly preferred among them.

The nonmagnetic powder may be subjected to the aforesaid surface treatment for improving dispersibility.

The intermediate magnetic layer preferably has a thickness of 0.2 to 5 μm, still preferably 0.5 to 4 μm, and particularly preferably 0.5 to 2.5 μm. If the thickness is less than 0.2 μm, the resulting magnetic recording medium has insufficient bending stiffness. If it exceeds 5 μm, the resulting magnetic recording medium tends to have reduced overwrite characteristics. Therefore, the above-specified thickness range is recommended.

The magnetic recording medium of the present invention is suitable for magnetic tapes such, as 8 mm video tapes or DAT tapes. It is also applicable to other recording media, such as floppy discs.

The method for producing the magnetic recording medium of the present invention is described below.

The first magnetic coating composition and the second magnetic coating composition are simultaneously applied to a nonmagnetic support by wet-on-wet coating to the above-mentioned respective dry thickness to form top and intermediate magnetic layers. That is, it is preferable to form the top magnetic layer while the intermediate magnetic layer is wet.

The coating layer (top and intermediate layers) is then subjected to orientation in a magnetic field, dried, and wound up. If desired, the coating layer may be subjected to calendaring. A backcoat layer may be provided if desired. According to the end use, for example, as a magnetic tape, the coated film is subjected to aging at 40° to 70° C. for 6 to 72 hours, followed by slitting to desired width.

The above-mentioned simultaneous double coating technique is described in Japanese Patent Laid-Open No. 73883/93, column 42, line 31 to column 43, line 31. The technique comprises application of the first magnetic coating composition forming a top magnetic layer before the second magnetic coating composition forming an intermediate magnetic layer dries. According to this technique, a smooth interface between the top magnetic layer and the intermediate magnetic layer and also satisfactory surface properties for the top magnetic layer are secured. As a result, the magnetic recording medium causes few dropouts and can cope with high density recording, and the coating layer has excellent durability.

The magnetic orientation treatment is performed before the first and second magnetic coating compositions dry. For example, in the case of preparing a magnetic tape, the treatment can be carried out by a method comprising application of a magnetic field of about 500 Oe or more, preferably about 1000 to 10000 Oe, in parallel with the side coated with the first and the second magnetic coating compositions or a method comprising passing the coating layer through a solenoid of a magnetic field of 1000 to 10000 Oe while the first and second magnetic coating compositions are wet.

The drying step is carried out by, for example, feeding gas heated at 30° to 120° C. The drying degree can be controlled by adjusting the temperature and the feed rate of the gas.

The calendaring of the coating layer is carried out by, for example, super calendaring comprising passing the coated film through a pair of rolls, such as a combination of a metal roll and a cotton roll or a synthetic resin roll, or a combination of two metal rolls. The calendaring is conducted under conditions of 60° to 140° C. and 100 to 500 kg/cm.

The backcoat layer, which may be provided if desired, is provided on the reverse side of the nonmagnetic support, i.e., the side opposite to the top and intermediate magnetic layers. The backcoat layer can be formed by coating the nonmagnetic support with a backcoating composition generally used for the formation of a backcoat layer.

If desired, the resulting magnetic recording medium may be subjected to finishing, such as polishing of the magnetic layer and cleaning. Application of the first and second magnetic coating compositions can also be conducted by generally known successive coating techniques.

Having generally described this invention, a further understanding can be obtained by reference to certain specific examples which are provided herein for purposes of illustration only and are not intended to be limiting unless otherwise specified. Unless otherwise indicated, all the parts are given by weight.

EXAMPLE 1

A magnetic tape having the layer structure shown in Table 2 below was prepared in accordance with the method described below using a first magnetic coating composition (A) having the following formulation, a second magnetic coating composition (a) having the following formulation, and a backcoating composition having the following formulation.

The coercive force and saturation flux density of the top magnetic layer formed of the first magnetic coating composition (A) were 1880 Oe and 3510 gauss, respectively, as measured according to the measurement methods hereinafter described.

| First Magnetic Coating Composition (A): | |
|---|---|
| Acicular ferromagnetic metal powder comprised mainly of iron (Fe:Al:Ba:Si:Ni:Co (by weight) = 88:21:1:3:5); coercive force: 1840 Oe; saturation magnetization: 134 emu/g; average major axis diameter: 0.12 μm; specific surface area: 58 m²/g; crystal size by X-ray method: 150Å | 100 parts |
| Alumina (average particle size: 0.3 μm; | 8 parts |
| Carbon black (average primary particle size: 20 nm) | 2 parts |
| MR-110 (a trade name of a vinyl chloride copolymer containing a sulfoxyl group, produced by Nippon Zeon Co., Ltd.) | 10 parts |
| Vylon UR-8700 (a trade name of a polyurethane containing a sulfoxyl group, produced by Toyobo Co., Ltd.) | 7 parts |
| 2-Ethylhexyl stearate | 2 parts |
| Palmitic acid | 2 parts |
| Coronate-L (a trade name of a polyisocyanate compound, produced by Nippon Polyurethane Industry Co., Ltd.) | 3 parts |
| Methyl ethyl ketone | 120 parts |
| Toluene | 80 parts |
| Cyclohexanone | 40 parts |
| Second Magnetic Coating Composition (a): | |
| Mn—Zn Ferrite (a) shown in Table 1 | 100 parts |
| Carbon black (average primary particle size: 20 nm) | 2 parts |
| MR-110 (a trade name of a vinyl chloride | 10 parts |

-continued

| | |
|---|---|
| copolymer containing a sulfoxyl group, produced by Nippon Zeon Co., Ltd.) | |
| Vylon UR-8700 (a trade name of a polyurethane containing a sulfoxyl group, produced by Toyobo Co., Ltd.) | 7 parts |
| 2-Ethylhexyl stearate | 2 parts |
| Palmitic acid | 1 part |
| Coronate-L (a trade name of a polyisocyanate compound, produced by Nippon Polyurethane Industry Co., Ltd.) | 3 parts |
| Methyl ethyl ketone | 60 parts |
| Toluene | 40 parts |
| Cyclohexanone | 20 parts |
| Backcoating Composition: | |
| Carbon black (average primary particle size: 0.028 μm) | 32 parts |
| Carbon black (average primary particle size: 0.062 μm) | 8 parts |
| Nipporan 2301 (a trade name of polyurethane, produced by Nippon Polyurethane Industry Co., Ltd.) | 20 parts |
| Nitrocellulose (a product of Hercules Powder Co.; Hercules-Powder viscosity: ½ sec) | 20 parts |
| D-250N (a trade name of polyisocyanate, produced by Takeda Chemical Industries, Ltd.) | 4 parts |
| Copper phthalocyanine | 5 parts |
| Stearic acid | 1 part |
| Methyl ethyl ketone | 120 parts |
| Toluene | 120 parts |
| Cyclohexanone | 120 parts |

Preparation of Magnetic Recording Medium

The first and second magnetic coating compositions were applied to a 7 μm thick polyethylene terephthalate film to form the top and intermediate magnetic coating layers each having a dry thickness shown in Table 2 below. While wet, the coating layer was subjected to magnetic field orientation by passing through a solenoid of 5000 Oe, dried at 80° C., and taken up. The coating layer was calendared at 85° C. and 350 kg/cm (line pressure) to form the top and intermediate magnetic layers. The opposite side of the nonmagnetic support was then coated with the backcoating composition to a dry thickness of 0.5 μm, dried at 90° C., and taken up. After aging at 50° C. for 16 hours, the coated film was slit into an 8 mm wide strip to obtain a magnetic recording tape. The resulting magnetic tape was put into an 8 mm cassette case to prepare a 120-minute 8 mm videotape cassette.

The resulting magnetic tape was tested to evaluate surface roughness, C/N characteristics, and overwrite characteristics in accordance with the following methods. The results obtained are shown in Table 2 below.

Measurement Methods

1. Coercive force and Saturation flux density

Only the top magnetic layer was stripped off the nonmagnetic support and the intermediate magnetic layer by using an adhesive tape and cut into a specimen of prescribed dimension. The coercive force and saturation flux density of the top magnetic layer were measured with a vibrating magnetometer with an applied magnetic field of 10 kOe.

2. Surface roughness of magnetic recording medium

Surface roughness Ra was measured with a surface roughness meter "Surfcom 553A" manufactured by Tokyo Seimitsu Co., Ltd. under conditions of probe radius of 2 μm, load of 30 mg, magnification of 200,000, and a cut-off of 0.08 mm.

Ra (center-line average roughness) is a value, expressed in terms of "nm", obtained by the following formula, in which L is a measuring length of a center line sampled out of a roughness curve, and the roughness curve is represented by y=f(x), taking the sampled center line as the X-axis and the longitudinal direction as the Y-axis:

$$Ra = \frac{1}{L} \int_0^L |f(x)| dx$$

3. C/N Characteristics (evaluation of 8 mm tape)

A single wave of 9 MHz was recorded on a sample magnetic tape using an 8 mm video deck, the reformed commercially available Hi8 videotape recorder. The reproduction output (C) was observed with a spectrum analyzer, and a C/N ratio was obtained taking the level of 8 MHz as a noise level (N).

4. Overwrite characteristics

Signals of 2 MHz were recorded on a sample recording tape to a saturation level using an 8 mm video deck, the reformed commercially available Hi8 deck. Then, signals of 9 MHz were over-recorded. The residual output level of the 2 MHz signals was measured. The lower the residual output level, the more satisfactory the overwrite characteristics.

EXAMPLE 2

A magnetic tape was prepared in the same manner as in Example 1, except for using a magnetic coating composition (B) as a first magnetic coating composition. The resulting magnetic tape was tested and evaluated in the same manner as in Example 1. The results obtained are shown in Table 2 below.

The coercive force and saturated flux density of the top magnetic layer formed of the first magnetic coating composition (B) were 2260 Oe and 4020 gauss, respectively, as measured in the same manner as in Example 1.

First Magnetic Coating Composition (B)

First Magnetic Coating Composition (B) is the same as the First Magnetic Coating Composition (A) except for replacing the acicular ferromagnetic metal powder comprised mainly of iron used therein with the following.

Acicular ferromagnetic metal powder comprised mainly of iron (Fe:Al:Y:Ba:Co (by weight)=70:3:3:1:23); coercive force: 2160 Oe; saturation magnetization: 154 emu/g; average major axis diameter: 0.08 μm; specific surface area: 48 m²/g; crystal size by X-ray method: 170 Å

COMPARATIVE EXAMPLE 1

A magnetic tape was prepared in the same manner as in Example 1, except for using a coating composition (c) having the following formulation as the second magnetic coating composition. The resulting magnetic tape was tested and evaluated in the same manner as in Example 1. The results obtained are shown in Table 2 below.

Second Magnetic Coating Composition (c)

The same as the second magnetic coating composition (1), except for replacing Mn-Zn ferrite (a) with Mn-Zn ferrite (c) shown in Table 1.

COMPARATIVE EXAMPLE 2

A magnetic tape was prepared in the same manner as in Example 1, except that the intermediate magnetic layer was not formed. The resulting magnetic tape was tested and evaluated in the same manner as in Example 1. The results obtained are shown in Table 2 below.

EXAMPLE 3

A magnetic tape was prepared in the same manner as in Example 1, except for using a magnetic coating composition (C) as a first magnetic coating composition, and using a magnetic coating composition (b) as a second magnetic coating composition. The resulting magnetic tape was tested and evaluated in the same manner as in Example 1. The results obtained are shown in Table 2 below.

The coercive force and saturated flux density of the top magnetic layer formed of the first magnetic coating composition (C) were 1820 Oe and 1910 gauss, respectively, as measured in the same manner as in Example 1.

| First Magnetic Coating Composition (C): | |
| --- | --- |
| Hexagonal ferrite powder (hexagonal tabular Co—Ti substituted barium ferrite powder; coercive force: 1670 Oe; saturation magnetization: 56 emu/g; average tabular diameter: 0.06 pm; aspect ratio: 4 | 100 parts |
| Alumina (average particle size: 0.2 μm) | 5 parts |
| Carbon black (average primary particle size: 20 nm) | 2 parts |
| MR-110 (a trade name of a vinyl chloride copolymer containing a sulfoxyl group, produced by Nippon Zeon Co., Ltd.) | 6 parts |
| UR-8700 (a trade name of a polyurethane containing a sulfoxyl group, produced by Toyobo Co., Ltd.) | 4 parts |
| 2-Ethylhexyl stearate | 1.5 parts |
| Palmitic acid | 1.5 parts |
| Coronate-L (a trade name of a poly-isocyanate, produced by Nippon Polyurethane Industry Co., Ltd.) | 3 parts |
| Methyl ethyl ketone | 60 parts |
| Toluene | 40 parts |
| Cyclohexanone | 20 parts |

Second Magnetic Coating Composition (b)

The same as the second magnetic coating composition (a), except for replacing the Mn-Zn ferrite (a) with Mn-Zn ferrite (b) shown in Table 1 below.

COMPARATIVE EXAMPLE 4

A magnetic tape was prepared in the same manner as in Example 3, except for replacing the second magnetic coating composition with a nonmagnetic coating composition (e) having the following formulation. The resulting magnetic tape was tested and evaluated in the same manner as in Example 1. The results obtained are shown in Table 2 below.

Nonmagnetic Coating Composition (e)

The same as the second magnetic coating composition (a), except for replacing the Mn-Zn ferrite with $TiO_2$ ("TTO-55B" a trade name, produced by Ishihara Sangyo Kaisha, Ltd.; specific surface area: 37 $m^2/g$).

COMPARATIVE EXAMPLE 5

A magnetic tape was prepared in the same manner as in Example 2, except that the intermediate magnetic layer was not formed. The resulting magnetic tape was tested and evaluated in the same manner as in Example 1. The results obtained are shown in Table 2 below.

TABLE 1

| | Mn—Zn Ferrite | | | |
| --- | --- | --- | --- | --- |
| | (a) | (b) | (c) | (d) |
| <L> (μm) | 0.049 | 0.117 | 0.283 | 0.108 |
| ΔL (μm) | 0.014 | 0.033 | 0.246 | 0.261 |
| ΔL/<L> | 0.29 | 0.28 | 0.87 | 2.42 |
| <W> (μm) | 0.037 | 0.076 | 0.181 | 0.071 |
| ΔW (μm) | 0.012 | 0.028 | 0.196 | 0.182 |
| ΔW/<W> | 0.32 | 0.37 | 1.08 | 2.56 |
| Saturation Magnetization (emu/g) | 62 | 60 | 75 | 65 |
| Coersive Force (Oe) | 64 | 80 | 28 | 49 |

TABLE 2

| | | Top Magnetic Layer | | Intermediate Magnetic Layer | | | | | | |
| --- | --- | --- | --- | --- | --- | --- | --- | --- | --- | --- |
| | | First Magnetic Coating Composition | Dry Thickness (μm) | Second Magnetic Coating Composition | Dry Thickness (μm) | ΔL/<L> | ΔW/<W> | Ra (nm) | Charac- teristics 9MHz (dB) | Overwrite Charac- teristics (dB) |
| Ex. | 1 | A | 0.4 | (a) | 2.0 | 0.29 | 0.32 | 5.5 | +1.5 | −21.1 |
| | 2 | B | 0.4 | (a) | 2.0 | 0.29 | 0.32 | 4.9 | +2.9 | −20.2 |
| Comp. | 1 | A | 0.4 | (c) | 2.0 | 0.87 | 1.08 | 9.3 | −2.5 | −18.8 |
| Ex. | 2 | A | 2.4 | — | — | — | — | 5.9 | 0 (Standard) | 0 (Standard) |
| Ex. | 3 | C | 0.4 | (b) | 2.0 | 0.28 | 0.37 | 6.3 | +0.3 | −3.5 |
| Comp. | 3 | C | 0.4 | (d) | 2.0 | 2.42 | 2.56 | 11.1 | −2.5 | −2.8 |
| Ex. | 4 | C | 0.4 | (e) | 2.0 | — | — | 6.9 | 0 (Standard) | 0 (Standard) |
| | 5 | C | 2.4 | — | — | — | — | 6.6 | +1.8 | +18.3 |

COMPARATIVE EXAMPLE 3

A magnetic tape was prepared in the same manner as in Example 1, except for using a magnetic coating composition (d) having the following formulation as a second coating composition. The resulting magnetic tape was tested and evaluated in the same manner as in Example 3. The results obtained are shown in Table 2 below.

Second Magnetic Coating Composition (d)

The same as the second magnetic coating composition (a), except for replacing the Mn-Zn ferrite (a) with Mn-Zn ferrite (d) shown in Table 1, which was a 7:3 (by weight) mixture of Mn-Zn ferrite (a) and Mn-Zn ferrite (b).

Note: In Comparative Example 4, a nonmagnetic coating composition was used in place of a second magnetic coating composition to form a nonmagnetic intermediate layer in place of a magnetic intermediate layer.

In Examples 1 and 2 and Comparative Examples 1 and 2, the C/N characteristics and overwrite characteristics are expressed relatively, using Comparative Example 2 as a standard. In Example 3 and Comparative Examples 3 to 5, Comparative Example 4 is used as the standard.

As is apparent from the results in Table 2, it is seen that the magnetic recording medium according to the present invention exhibits excellent overwrite characteristics due to the soft magnetic powder of the intermediate magnetic layer and also exhibits excellent surface roughness and C/N characteristics because the soft magnetic powder used has a specific particle size distribution which satisfies the above-mentioned formulae (1) and (2).

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A magnetic recording medium comprising a nonmagnetic support having formed thereon a plurality of magnetic layers including a top magnetic layer and a lower magnetic layer adjacent to the top magnetic layer, wherein the lower magnetic layer contains soft magnetic oxide powder or soft magnetic metal powder, said soft magnetic oxide powder and soft magnetic metal powder having, in its projective image, an average long diameter <L> and a standard deviation of the longer diameter ΔL satisfying the relationship represented by formula (1), and an average shorter diameter <W> and a standard deviation of the shorter diameter ΔW satisfying the relationship represented by formula (2):

$$0.05 \leq \Delta L/<L> \leq 0.8 \quad (1)$$

$$0.05 \leq \Delta W/<W> \leq 0.8 \quad (2)$$

and the top magnetic layer contains ferromagnetic metal powder or hexagonal ferrite powder.

2. The magnetic recording medium according to claim 1, wherein the average <L> of the longer diameter L is about 0.01 to 0.2 μm, the standard deviation ΔL of the longer diameter L is about 0.003 to 0.2 μm, the average <W> of the shorter diameter W is about 0.01 to 0.2 μm, and the standard deviation ΔW of the shorter diameter W is about 0.003 to 0.2 μm.

3. The magnetic recording medium according to claim 1, wherein the saturation magnetization of the ferromagnetic metal powder ranges from 130 to 160 emu/g.

4. The magnetic recording medium according to claim 1, wherein the top magnetic layer has a thickness of 0.05 to 1.0 μm, and said top magnetic layer is formed while the intermediate magnetic layer is wet.

5. The magnetic recording medium according to claim 1, wherein a backcoat layer is provided on the reverse side of the nonmagnetic support opposite said plurality of magnetic layers.

6. The magnetic recording medium according to claim 1, wherein the ferromagnetic metal powder has a coercive force of 1600 to 2500 Oe.

7. The magnetic recording medium according to claim 1, wherein the hexagonal ferrite powder has a coercive force of 1300 to 2300 Oe.

8. The magnetic recording medium according to claim 1, wherein the ferromagnetic metal powder has a metal content of not less than 50% by weight and said metal consists of 60% or more by weight of Fe.

9. The magnetic recording medium according to claim 4, wherein the top magnetic layer has a thickness of 0.05 to 0.8 μm.

10. The magnetic recording medium according to claim 1, wherein the soft magnetic oxide powder is a spinel ferrite powder.

11. The magnetic recording medium according to claim 10, wherein the soft magnetic oxide powder has a coercive force of 0.1 to 150 Oe and a saturation magnetization of 30 to 90 emu/g.

12. The magnetic recording medium according to claim 1, wherein the soft magnetic metal powder has a coercive force of 0.02 to 100 Oe and a saturation magnetization of 50 to 500 emu/g.

13. The magnetic recording medium according to claim 1, wherein the soft magnetic oxide powder and soft magnetic metal powder are selected from the group consisting of spherical, tabular or amorphous powder.

14. The magnetic recording medium according to claim 1, wherein the lower magnetic layer further contains nonmagnetic powder.

15. The magnetic recording medium according to claim 1, wherein the lower magnetic layer has a thickness of 0.2 to 5 μm.

16. The magnetic recording medium according to claim 1, wherein the top magnetic layer contains the ferromagnetic metal powder and has a coercive force of 1800 to 2400 Oe.

17. The magnetic recording medium according to claim 16, wherein the top magnetic layer has a saturation flux density of 3000 to 4500 gauss.

18. The magnetic recording medium according to claim 1, wherein the top magnetic layer contains hexagonal ferrite powder and has a coercive force of 1600 to 2200 Oe.

19. The magnetic recording medium according to claim 18, wherein the top magnetic layer has a saturation flux density of 1500 to 2500 gauss.

* * * * *